United States Patent
Masuda et al.

(10) Patent No.: US 7,201,686 B2
(45) Date of Patent: Apr. 10, 2007

(54) SADDLE-TYPE VEHICLE AND ENGINE

(75) Inventors: Tatsuya Masuda, Shizuoka-ken (JP); Yousuke Ishida, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/333,807

(22) Filed: Jan. 17, 2006

(65) Prior Publication Data

US 2006/0172839 A1    Aug. 3, 2006

Related U.S. Application Data

(63) Continuation of application No. PCT/JP04/08884, filed on Jun. 24, 2004.

(30) Foreign Application Priority Data

Jul. 16, 2003    (JP)    .............................. 2003-275181

(51) Int. Cl.
| | |
|---|---|
| B62J 13/00 | (2006.01) |
| B62J 25/00 | (2006.01) |
| F16H 55/56 | (2006.01) |
| B62K 23/08 | (2006.01) |

(52) U.S. Cl. .......................... 474/144; 474/8; 180/230; 180/231

(58) Field of Classification Search ............ 474/11–15, 474/45–46, 144–146; 180/227–230, 218, 180/231; 74/606 R, 606 A; 123/195 R, 123/196 R See application file for complete search history.

(56) References Cited

U.S. PATENT DOCUMENTS

| | | | | |
|---|---|---|---|---|
| 4,344,500 | A | * | 8/1982 | Kurata et al. ............... 180/230 |
| 4,345,664 | A | * | 8/1982 | Anno et al. ................. 180/230 |
| 4,497,285 | A | * | 2/1985 | Kondo .................... 123/41.65 |
| 4,723,619 | A | * | 2/1988 | Yamamoto et al. ......... 180/219 |
| 5,152,361 | A | * | 10/1992 | Hasegawa et al. .......... 180/230 |
| 6,497,211 | B2 | * | 12/2002 | Nomura et al. ......... 123/195 R |

FOREIGN PATENT DOCUMENTS

| | | | | | |
|---|---|---|---|---|---|
| JP | 52-56104 | | 4/1977 | | |
| JP | 54-49429 | A * | 4/1979 | | ...................... 74/6 |
| JP | 02-231293 | | 9/1990 | | |
| JP | 03-176289 | A * | 7/1991 | | |
| JP | A 05-213262 | | 8/1993 | | |

(Continued)

OTHER PUBLICATIONS

International Search Report, Sep. 21, 2004; 2 pages.

*Primary Examiner*—Marcus Charles
(74) *Attorney, Agent, or Firm*—Knobbe, Martens, Olson & Bear, LLP

(57) ABSTRACT

A saddle-type vehicle has an engine unit with a continuously variable transmission. The transmission has a primary sheave and a secondary sheave that are connected by a flexible transmitter such as a belt. The primary sheave, the secondary sheave and the belt are positioned in a transmission case. A starting kick shaft is positioned on the same side of the engine unit as the transmission case but the starting kick shaft is positioned outside of a profile of the transmission case when the engine unit is viewed from a lateral side.

9 Claims, 7 Drawing Sheets

FOREIGN PATENT DOCUMENTS

| | | |
|---|---|---|
| JP | 05-229470 | 9/1993 |
| JP | A 06-048363 | 2/1994 |
| JP | 11-49064 A * | 2/1999 |
| JP | 11-166467 A * | 6/1999 |
| JP | 2000-34967 A * | 2/2000 |
| JP | 2000-205091 A * | 7/2000 |

* cited by examiner

SADDLE-TYPE VEHICLE AND ENGINE

CROSS-REFERENCE TO RELATED APPLICATIONS

This application is a continuation of PCT Application No. PCT/JP2004/008884, filed on Jun. 24, 2004, which claims priority from Japanese Patent Application No. 2003-275181, filed Jul. 16, 2003, each of which is hereby incorporated by reference in its entirety.

BACKGROUND OF THE INVENTION

1. Field of the Invention

The present invention generally relates to engines used with saddle-type vehicles.

2. Description of the Related Art

Saddle-type vehicles can have a number of different configurations, such as motorcycles, scooters, four-wheeled vehicles and the like. The vehicles generally include a rear arm which supports one or more rear wheels and a rear-arm bracket that supports the rear arm relative to a vehicle body. The rear-arm bracket usually has a pivot shaft about which the rear arm pivots. In other words, the rear arm is supported such that it can pivot about the pivot shaft.

In some configurations, the saddle-type vehicles employ V-belt continuously variable transmissions. These transmissions include a primary sheave (i.e., a driving pulley) that rotates with the rotation of an engine crankshaft, a secondary sheave (i.e., a driven pulley), and a V-belt that wraps around the primary sheave and the secondary sheave. The primary sheave, the secondary sheave, and the V-belt are generally accommodated in a belt chamber of a transmission case.

In many of these configurations, a starting kick shaft is used to start the engine. In addition, a clutch and a speed-reduction mechanism often are provided between a shaft that is coupled to the secondary sheave and a transmission drive shaft that outputs rotation from the transmission. For example, known engines include an engine in which a secondary sheave shaft and a drive shaft are connected via a centrifugal clutch and an idle shaft of a speed-reduction mechanism. The centrifugal clutch can be positioned in a crankcase of the engine. A chain or the like can be used to transfer the rotation of the drive shaft to the rear wheel. For instance, the chain can be wrapped around a sprocket provided on the drive shaft and a sprocket provided on a shaft associated with a rear wheel.

In JP-A-5-213262 (hereinafter, referred to as Patent Document 1), the starting kick shaft is disposed in a position opposite to the V-belt in the vehicle body so as not to interfere with the V-belt. More specifically, the V-belt automatic transmission is disposed on the right side of the illustrated vehicle body while the starting kick shaft is disposed on the left side of the vehicle. JP-A-6-48363 (hereinafter, referred to as Patent Document 2) discloses an engine in which the starting kick shaft and the V-belt automatic transmission are disposed on the same side of the vehicle body. In this engine, sufficient space is provided between the primary sheave and the secondary sheave and the starting kick shaft is disposed between the primary sheave and the secondary sheave. The starting kick shaft is disposed inside the outline of the V-belt as viewed from the side so as not to interfere with the V-belt.

SUMMARY OF THE INVENTION

In the engine disclosed in Patent Document 1, however, the starting kick shaft is disposed opposite to the transmission case. Due to this configuration, the motorcycle must have an increased breadth to accommodate the components.

The engine disclosed in Patent Document 2, while not having the same problem as Patent Document 1, suffers from a very limited ability to layout the shafts in suitable positions due to the need to avoid interference between the starting kick shaft and the V-belt. In other words, the drive shaft and the speed-reduction mechanism must be positioned so as to not interfere with the starting kick shaft and, therefore, cannot be freely positioned inside the outline of the V-belt or in the rough vicinity thereof as viewed from the side of the engine, because the starting kick shaft is disposed inside the outline.

Thus, an improved engine and transmission has been configured to increase the layout flexibility in the region around the drive shaft and/or starting kick shaft.

One aspect of the present invention involves a saddle-type vehicle comprising an engine unit. The engine unit comprises an engine body with a transversely extending crankshaft being positioned within the engine body. The engine unit also comprises a transmission. The transmission comprises a primary sheave and a secondary sheave. The primary sheave is connected to the crankshaft. The secondary sheave is connected to a secondary sheave shaft. The secondary sheave shaft extends in a transverse direction. A flexible transmitter wraps around the primary sheave and the secondary sheave. A transmission case accommodates the primary sheave, the secondary sheave and the transmission belt. The engine unit also comprises a starting kick shaft. The transmission case and the starting kick shaft extending outward from the engine unit in a first direction, and the starting kick shaft is not positioned within a profile of the transmission case when the engine unit is viewed from a lateral side.

Another aspect of the present invention involves a saddle-type vehicle comprising an engine unit. The engine unit comprises a transversely extending crankshaft. A primary sheave is connected to the crankshaft. A secondary sheave is connected to the primary sheave by a flexible transmitter. The secondary sheave is connected to a secondary sheave shaft. The secondary sheave shaft is connected to a drive shaft by a speed reduction configuration. The speed reduction configuration comprises an idle shaft. A transmission case encloses the primary sheave and the secondary sheave together with the flexible transmitter. When viewed in an axial direction of the crankshaft, the secondary sheave shaft, the drive shaft and the idle shaft all are positioned within a profile of the transmission case, and a starter kick shaft is disposed outside of the profile of the transmission case but is connected to the crankshaft such that rotation of the starter kick shaft can result in rotation of the crankshaft.

BRIEF DESCRIPTION OF THE DRAWINGS

These and other features, aspects and advantages of the present invention will be described with reference to drawings of a preferred embodiment, which embodiment is intended to illustrate, and is not intended to limit the scope of, the present invention. The drawings comprise seven figures.

DETAILED DESCRIPTION OF THE PREFERRED EMBODIMENT

Figure 1:
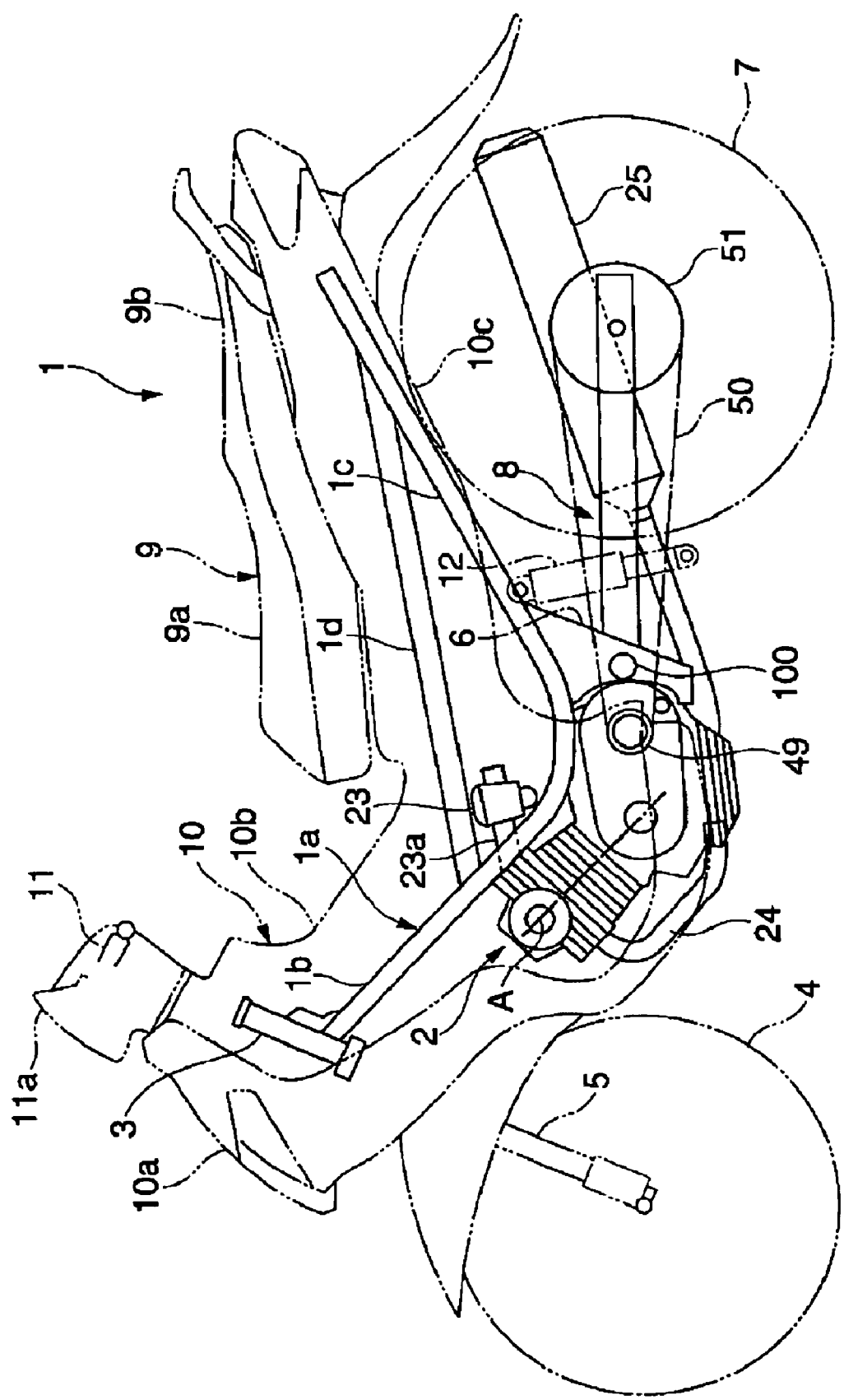
FIG. 1 is a left side view of a saddle-type vehicle and an engine unit that are arranged and configured in accordance with certain features, aspects and advantages of the present invention.

FIG. 1 shows a saddle-type vehicle 1 that comprises an engine unit 2 that is arranged and configured in accordance with certain features, aspects and advantages of the present invention. The illustrated engine unit 2 preferably comprises an engine with an integrated continuously variable transmission. The illustrated engine unit 2 comprises an air-cooled, four-cycle single-cylinder engine. Other vehicles and engine units also may benefit from certain features, aspects and advantages of the present invention. In addition, other types of engines and motors also can be used.

With reference to FIG. 1, a head pipe 3 is fixed to a forward portion of a body frame 1a. The head pipe 3 supports a front fork 5, which can be turned laterally to effect steering of the vehicle 1. The front fork 5 preferably supports a front wheel 4 at the lower end.

A rear-arm bracket 6 is disposed in the center of the length of the illustrated vehicle body. The rear-arm bracket 6 supports a rear arm 8 via a pivot shaft 100. The pivot shaft 100 defines a supporting point or pivot axis. The rear arm 8 is pivotally supported by the pivot shaft 100. The rear arm 8 therefore can rotate or pivot about the pivot shaft 100. A rear portion of the rear arm 8 supports a rear wheel 7.

A seat 9 is mounted to the body frame 1a. The seat 9 preferably includes a driver seat 9a and a rear-passenger seat 9b. The driver seat 9a and the rear-passenger seat 9b preferably are arranged in tandem and can be integrally formed. The engine unit 2 preferably is mounted to the body frame 1a such that a drive shaft 48 (refer to FIG. 4) of the engine unit 2 is positioned rearward of a crankshaft 28 of the engine unit 2. In the illustrated engine unit 2, the pivot shaft 100 of the rear arm 8 is positioned rearward of the engine unit 2 at a location that is generally rearward of the drive shaft 48. See FIG. 4.

With reference again to FIG. 1, the illustrated body frame 1a comprises a down tube 1b that extends obliquely downward in a rearward direction from the head pipe 3. An upper tube 1c extends obliquely upward from a rear portion of the down tube 1b. A seat rail 1d joins the down tube 1b and the upper tube 1c and extends generally longitudinally between the down tube 1b and the upper tube 1c. In one preferred configuration, the down tube 1b, the upper tube 1c, and the seat rail 1d are provided on each of the opposing sides of the vehicle body (i.e., the left side and the right side).

Preferably, the body frame 1a is covered with a cover 10. The cover can be formed of any suitable material. In one configuration, the cover 10 is formed of a resin-based material. The cover 10 preferably comprises a front cover 10a, a leg shield 10b, a side cover 10c and the like. A steering handle 11 covered with a handle cover 11a can be secured to the upper end of the front fork 5. A rear cushion 12 (i.e., a shock absorber) can be positioned between the rear arm 8 and the rear-arm bracket 6.

Figure 2:
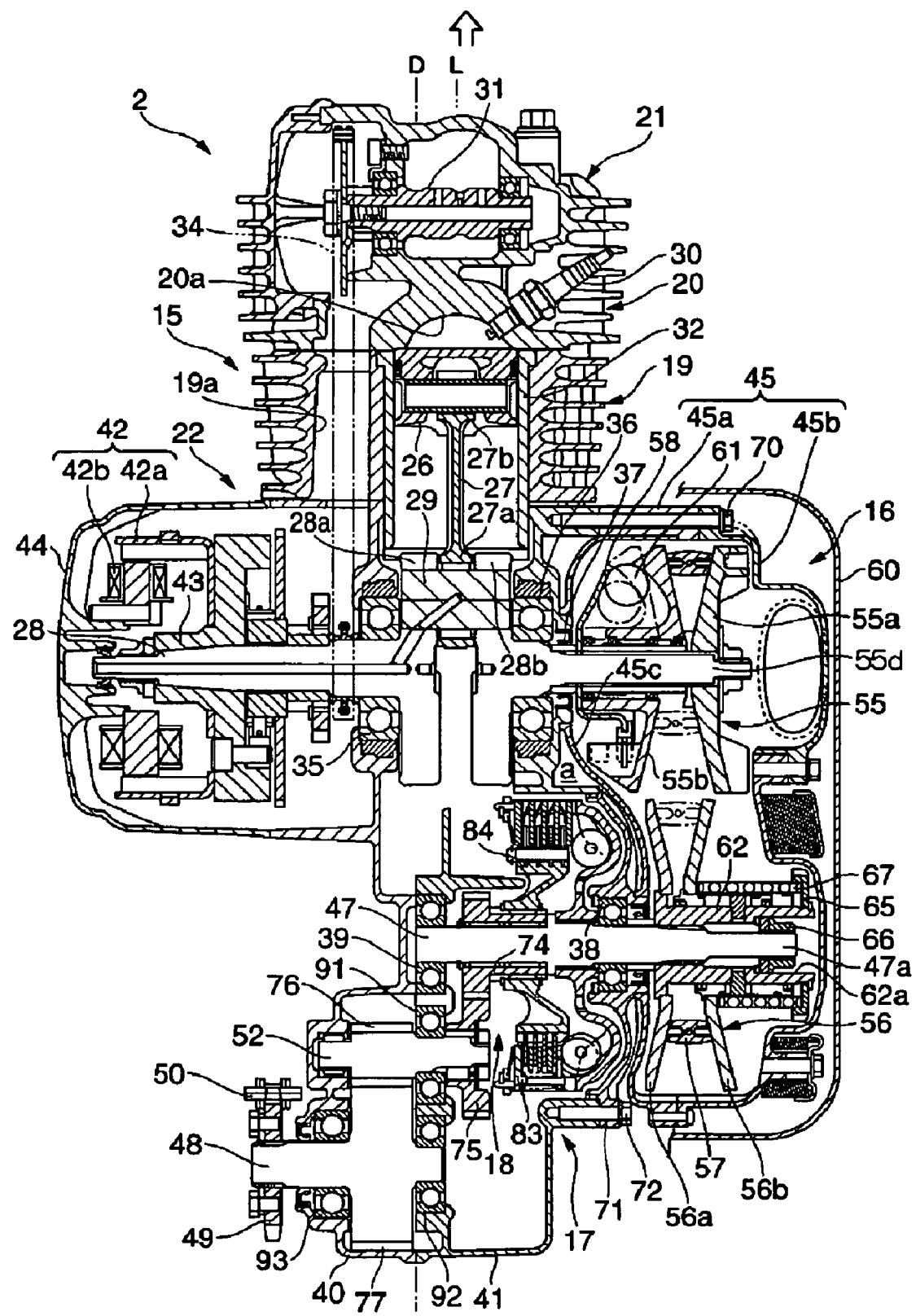
FIG. 2 is a cross-sectional view of the engine unit of FIG. 1 taken along the line II—II in FIG. 4.

The engine unit 2 preferably hangs from the down tube 1b of the body frame 1a. With reference to FIG. 2, the illustrated engine unit 2 preferably comprises an engine body 15. A cylinder axis A of the engine body 15 preferably inclines approximately 45 degrees relative to an imaginary generally horizontal plane that extends through the engine unit 2.

Figure 3:
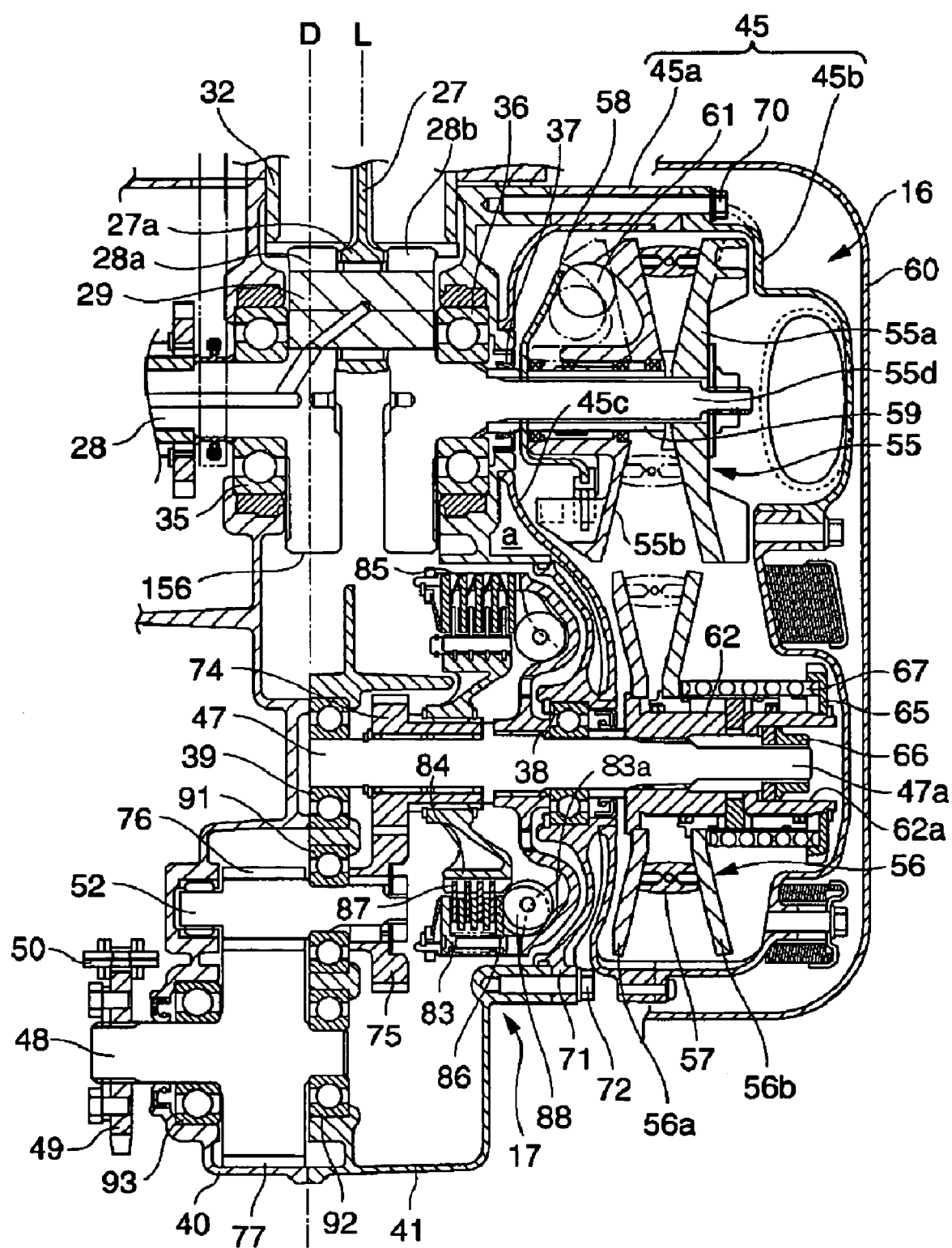
FIG. 3 is a partial cross-sectional view of the engine unit of FIG. 1.
Figure 4:
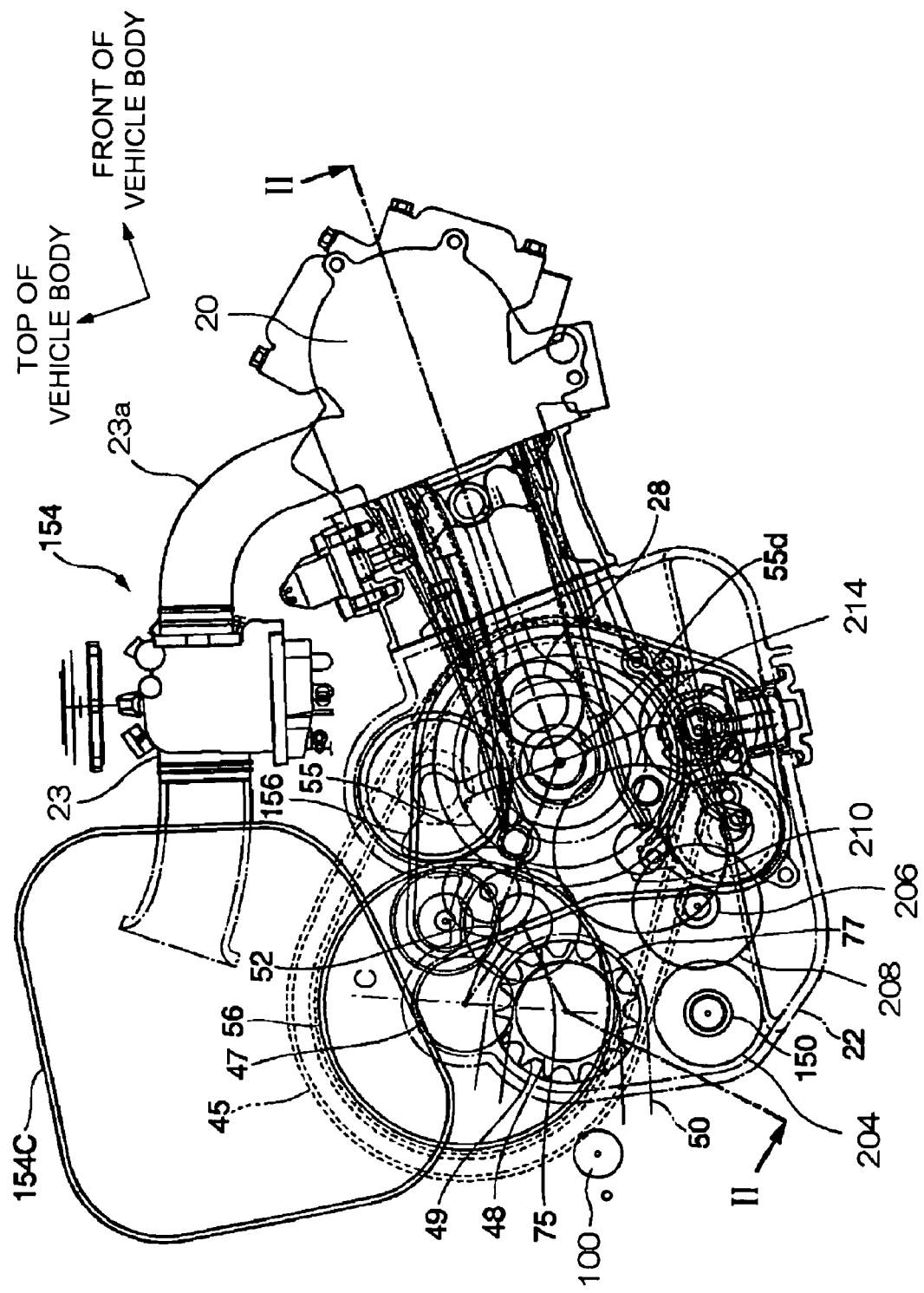
FIG. 4 is a right side view of the arrangement of rotating shafts of the engine unit of FIG. 1.

With reference now to FIGS. 2 through 4, the engine unit 2 also comprises a continuously variable transmission 16, a centrifugal clutch 17 and a speed-reduction mechanism 18. The continuously variable transmission 16 preferably comprises a belt-type continuously variable transmission. In one configuration, the continuously variable transmission 16 comprises a V-belt type continuously variable transmission.

The engine body 15 preferably comprises a cylinder block 19, a cylinder head 20 and a crank case 22. The cylinder head 20 can be joined with an upper joint surface of the cylinder block 19. A head cover 21 can be provided on the cylinder head 20. The crank case 22 can be joined with a lower joint surface of the cylinder block 19. The crank case 22 preferably supports the crankshaft 28 and a secondary sheave shaft 47 (i.e., a transmission shaft).

An intake port (not shown) communicates with a combustion recess 20a. The intake port can open through a rear surface of the cylinder head 20. With reference to FIG. 1, an intake pipe 23a preferably connects the intake port to a carburetor 23. An exhaust port (not shown) also communicates with the combustion recess 20a. The exhaust port can open through a front surface of the cylinder head 20. The exhaust port preferably connects to an exhaust pipe 24. As shown in FIG. 1, the exhaust pipe 24 can extend obliquely downward in a rearward direction such that it passes along a right side of the engine body 15 before extending obliquely upward in a rearward direction. The exhaust pipe 24 preferably connects to a muffler 25. The muffler 25 can be positioned to the right side of the rear wheel 7. With reference to FIG. 2, a spark plug 30 can be disposed in the combustion recess 20a.

A chain chamber 19a connecting the interior of the crank case 22 and the interior of the cylinder head 20 can be provided along the left of the cylinder block 19. The chain chamber 19a preferably houses a timing chain 34. The timing chain 34 can be wound around the crankshaft 28 and a cam shaft 31. Thus, the cam shaft 31 rotates with the crankshaft 28 and the cam shaft 31 opens and closes intake valves and/or exhaust valves. Other valve actuating mechanisms also can be used (e.g., push rods, solenoids, etc.).

A piston 26 is slidably disposed in a cylinder bore defined in the cylinder block 19. In the illustrated configuration, the cylinder bore is defined by a cylinder sleeve 32 that is mounted in the cylinder block 19. The piston 26 connects to a small end 27b of a connecting rod 27. A crankpin 29 is provided between a left crank arm 28a and a right crank arm 28b of the crankshaft 28. A large end 27a of the connecting rod 27 connects to the crankpin 29.

In the illustrated configuration, the crank case 22 comprises at least two portions. Preferably, the crank case 22 is divided into two cases, namely, a first case 40 and a second case 41. The first case is on the left side and the second case is on the right side. The joint surface between the first case 40 and the second case 41 (i.e., the dividing surface D of the crank case 22) preferably extends generally parallel to the axis line L of the cylinder block 19. The dividing surface D preferably does not align with the axis line L but is offset to one side of the axis line L. In the illustrated configuration, the dividing surface D is offset to the left of the axis line L.

A case cover 71 is mounted to the right side of the second case 41 in the illustrated configuration. Preferably, the second case 41 has an opening along its right side, which opening is covered with the case cover 71. The case cover 71 can be removably secured to the second case 41 with a bolt 72 or with any other suitable technique (e.g., interlocking mechanical components, slots, tabs or the like). The case cover 71 preferably is easily installed and removed. The centrifugal clutch 17 and the secondary sheave shaft 47 can be easily removed from the engine unit 2 once the case cover 71 is removed from the second case 41.

A generator case 44 can be removably secured to a forward portion of the left side of the first case 40. Other positions also are possible. The generator case 44 at least partially defines a cavity in which a generator 42 can be positioned. With continued reference to FIG. 2, a transmission case 45 for accommodating the continuously variable transmission 16 preferably is mounted to the right side of the second case 41. The continuously variable transmission 16 can be positioned within a transmission chamber that is at least defined by the transmission case 45.

Advantageously, the transmission case 45 is separated from the crank case 22 and comprises a case body 45a and a cover 45b. The case body 45a can be positioned to the right of the second case 41 and can open to the right. The cover 45b can be positioned to the right of the case body 45a and can be positioned such that it generally closes the opening formed to the right of the case body 45a. In one preferred configuration, the case body 45a, the cover 45b, and the second case 41 can be secured together with a single bolt 70. Other configurations also can be used. A clearance "a" can be provided between the bottom wall 45c of the case body 45a and the second case 41. Because the case body 45a and the second case 41 are spaced apart in this manner (e.g., a void is formed between the case body 45a and the second case 41), the likelihood of heat from the engine body 15 being transmitted to the transmission case 45 is greatly reduced. In one preferred configuration, the right side of the transmission case 45 can be covered with a further cover 60 that provides a pleasing aesthetic appearance.

The crankshaft 28 extends generally horizontally in a forward portion (i.e., in the upper portion of FIG. 2) of the crank case 22. While not shown, a balancer shaft can be driven by the crankshaft 28, which balancer shaft can comprise a balancer weight 156 (see FIG. 4). The portion of the illustrated crankshaft 28 positioned to the left of an imaginary longitudinal plane that intersects the axis line L is supported by the first case 40 via a bearing 35. The portion of the illustrated crankshaft 28 positioned to the right of the imaginary longitudinal plane that intersects the axis line L is rotatably supported by the second case 41 via a bearing 36. Other support configurations also can be used.

The left portion of the illustrated crankshaft 28 extends beyond the first case 40 into the interior of the generator case 44. The left end of the crankshaft 28 carries the generator 42. The generator 42 can be connected to the crankshaft in any suitable manner. In one configuration, the generator 42 comprises an input shaft that is separate from, but driven by, the crankshaft 28. The illustrated configuration, however, is advantageously compact in structure. The generator 42 preferably comprises a stator 42b and a rotor 42a that is opposed to the stator 42b. The rotor 42a can be fixed to a sleeve 43 that rotates with the crankshaft 28. The sleeve 43 preferably receives a tapered portion of the crankshaft 28. The stator 42b can be fixed to the generator case 44. As the rotor 42a spins relative to the stator 42b, the generator 42 creates an electrical supply for use by the engine and other components.

The right portion of the illustrated crankshaft 28 extends beyond the second case 41 into the interior of the chamber defined at least partially by the transmission case 45. The right end of the crankshaft 28 carries a primary sheave 55 (i.e., a driving pulley) of the continuously variable transmission 16. The sheave 55 can be secured to the crankshaft 55 with a nut or in any other suitable manner. The primary sheave 55 therefore rotates with the crankshaft 28. In the illustrated configuration, the right end of the crankshaft 28 defines a primary sheave shaft 55d. However, the primary sheave 55 and the crankshaft 28 can be connected in any suitable manner. For example, in some configurations, the primary sheave shaft 55d and the crankshaft 28 may be formed separately. Moreover, the primary sheave shaft 55d may not necessarily be coaxial with the crankshaft 28 but may be parallel with the crankshaft 28. Accordingly, as used throughout this application, unless otherwise apparent, "connection" connotes any style of connection, direct or indirect.

A sealing member 37 can be provided between the part of the second case 41 through which the crankshaft 28 extends and the bottom wall 45c of the transmission case 45. The second case 41 therefore is generally sealed from the transmission case 45. Accordingly, when a clutch is accommodated in the second case 41, the clutch can be of the wet type of clutch. In a preferred configuration, the centrifugal clutch 17 comprises a multiplate wet centrifugal clutch.

The secondary sheave shaft 47, which comprises a rotational axis that is generally parallel to the crankshaft 28, can be positioned at a rearward location in the crank case 23 (i.e., in the lower portion of FIG. 2). The right portion of the secondary sheave shaft 47 can be supported by the case cover 71 with a bearing 38 while the left side can be supported by the left end of the second case 41 with a bearing 39. The right portion of the secondary sheave shaft 47 preferably extends beyond the second case 41 into the transmission case 45. In a preferred configuration, the right end of the secondary sheave shaft 47 connects to a secondary sheave 56 (i.e., driven pulley) of the continuously variable transmission 16. More preferably, the secondary sheave 56 is arranged coaxially with the secondary sheave shaft 47.

With continued reference to FIG. 2, the centrifugal clutch 17 can be mounted to the left of the secondary sheave shaft 47. Preferably, the centrifugal clutch 17 is arranged generally adjacent to the cylinder block 19. Such an arrangement can be accommodated by the large interior chamber defined by the second case 41. More particularly, in the illustrated engine unit 2, the dividing surface D of the crank case 22 is positioned to the left of the imaginary longitudinal plane that intersects the axis line L of the cylinder block 19. Such a configuration results in a rather wide lateral space in the second case 41. Thus, the centrifugal clutch 17 can be positioned to the left of the secondary sheave 56.

In the illustrated configuration, the centrifugal clutch 17 comprises a multiplate wet centrifugal clutch. Thus, the clutch 17 comprises an inner clutch 84 and a bowl-shaped outer clutch 83. Splines connect the outer clutch 83 to the secondary sheave shaft 47. Other constructions also can be used such that the outer clutch 83 rotates with the secondary sheave shaft 47 while the outer clutch 83 can still move freely along the axis of the secondary sheave shaft 47. The inner clutch 84 is positioned coaxially inside the outer clutch 83. The inner clutch 84 is in spline engagement with a primary reduction small gear 74. The reduction small gear 74 rotates with the inner clutch 84. Preferably, the reduction small gear 74 is rotatably supported by the secondary sheave shaft 47.

With reference to FIG. 3, multiple outer clutch plates 85 can be disposed in the outer clutch 83. On both sides of the outer clutch plates 85, pressure plates 86 are disposed. The outer clutch plates 85 and the pressure plates 86 are connected to the outer clutch 83 such that the outer clutch plates 85 and the pressure plates 86 will rotate with the outer clutch 83. Between the outer clutch plates 85 and the pressure plates 86, inner clutch plates 87 are disposed. The inner clutch plates 87 are connected to the outer circumference of the inner clutch 84 such that the inner clutch plates 87 will rotate with the inner clutch 84.

A moveable weight 88 is disposed between a cam surface 83a and the right pressure plate 86 in the illustrated embodiment. When the rotational speed of the outer clutch 83 exceeds a prescribed value, the weight 88 moves radially outward due to the centrifugal force applied to the weight. As the weight 88 moves radially outward, the weight moves along the cam surface 83a and works against the right pressure plate 86. Thus, the right pressure plate 86 is pushed to the left by the weight 88 and the outer clutch plates 85 and the inner clutch plates 87 become engaged. To better show this feature, in FIGS. 2 and 3, the front of the centrifugal clutch 17 (the upper part in FIGS. 2 and 3) is shown in a disengaged state while the rear (the lower part in FIGS. 2 and 3) is shown in an engaged state.

The continuously variable transmission 16 comprises the primary sheave 55, the secondary sheave 56, and a flexible transmitter 57, such as a V-belt, wound around the primary sheave 55 and the secondary sheave 56. The primary sheave 55 is mounted to the right end of the illustrated crankshaft 28, as has been described. Preferably, the primary sheave 55 and the crankshaft 28 are connected such that they rotate together. Accordingly, the crankshaft 28 drives the primary sheave 55. Preferably, the secondary sheave 56 is connected for rotation with the secondary sheave shaft 47 such that the secondary sheave 56 drives the secondary sheave shaft 47.

The primary sheave 55 comprises a fixed pulley half 55a and a movable pulley half 55b. The fixed pulley half 55a is fixed to the end of the crankshaft 28 and rotates with the crankshaft 28. The movable pulley half 55b is disposed to the left of the fixed pulley half 55a in the illustrated configuration. A slide collar 59 can be mounted to the crankshaft 28 such that the slide collar 59 is slidable along a portion of the crankshaft 28. The movable pulley half 55b is mounted to the crankshaft 28 via the slide collar 59. In some configurations, the movable pulley half 55b and the slide collar 59 can be integrally formed. The movable pulley half 55b, therefore, rotates with the crankshaft 28 and can move freely along the axis of the crankshaft 28. A cam plate 58 is disposed to the left of the movable pulley half 55b. Between the cam plate 58 and the movable pulley half 55b is positioned a moveable cylindrical weight 61.

The secondary sheave 56 also comprises a fixed pulley half 56a and a movable pulley half 56b. The movable pulley half 56b is connected to the right end of the secondary sheave shaft 47 in the illustrated configuration. The movable pulley half 56b rotates with the secondary sheave shaft 47 and can move substantially freely along the axis of the secondary sheave shaft 47. A coil spring 67 is provided at the right end of the secondary sheave shaft 47. The movable pulley half 56b receives a leftward biasing force from the coil spring 67 in the illustrated configuration. The fixed pulley half 56a is disposed to the left of the movable pulley half 56b. A cylindrical slide collar 62 is connected to a portion of the fixed pulley half 56a. In the illustrated configuration, the cylindrical slide collar 62 is connected to the axial center of the fixed pulley half 56a. Splines connect the slide collar 62 to the secondary sheave shaft 47 although other suitable constructions that connect the slide collar and the secondary sheave shaft 47.

The speed reduction ratio of the continuously variable transmission 16 is determined by the relative force of the weight 61 pushing the driving-side movable pulley half 55b to the right and the force with which the coil spring 67 pushes the driven-side movable pulley half 56b to the left. In other words, when the rotational speed of the crankshaft 28 increases, the weight 61 moves radially outward (i.e., upward in FIG. 3) under the influence of centrifugal force to move the driving-side movable pulley half 55b to the right. Concurrently, the driven-side movable pulley half 56b moves to the right against the biasing force of the coil spring 67. As a result, the effective diameter of the V-belt 57 (i.e., the diameter along the pulleys at which the belt rides) in the driving pulley 55 increases and the effective diameter of the driven pulley 56 decreases, thus reducing the speed reduction ratio. On the other hand, when the rotational speed of the crankshaft 28 decreases, the centrifugal force of the weight 61 decreases, so that the weight 61 moves radially inward. Accordingly, the driving-side movable pulley half 55b moves to the left when the driven-side movable pulley half 56b moves to the left under the biasing force of the coil spring 67. As a result, the effective diameter of the V-belt 57 at the driving pulley 55 decreases and the effective diameter at the driven pulley 56 increases, thus increasing the speed reduction ratio.

A lock nut 66 can be screwed onto the end of the secondary sheave shaft 47. The secondary sheave 56 is fixed to the secondary sheave shaft 47 with the lock nut 66. Preferably, the lock nut 66 is secured to the right end 62a of the slide collar 62. The inside diameter of the slide collar 62 is stepped in the axial direction while the right end 47a of the secondary sheave shaft 47 decreases in steps. In other words, the secondary sheave shaft 47 decreases in diameter stepwise toward the end. Thus, the lock nut 66 can be positioned inside the right end 62a of the slide collar 62. Accordingly, the lock nut 66 can be located on the left of a spring bearing 65 of the coil spring 67. This allows the outward projection to be minimized without decreasing the length of the coil spring 67. Thus, the breadth of the engine unit 2 can be reduced with this construction.

With reference again to FIG. 2, the illustrated idle shaft 52 carries a reduction large gear 75, which engages with the primary reduction small gear 74 that is carried by the secondary sheave shaft 47. The idle shaft 52 further comprises a secondary reduction small gear 76. In one configuration, the idle shaft 52 and the secondary reduction small gear 76 are integrally formed. The drive shaft 48 carries a reduction large gear 77, which engages with the reduction small gear 76. In some configurations, the drive shaft 48 and the reduction large gear 77 are integrally formed.

In the illustrated configuration, the right end of the idle shaft 52 is supported by the left part of the second case 41 with a bearing 91. The left end of the illustrated idle shaft 52 is supported by the left part of the first case 40 through needle bearings or the like. The drive shaft 48 is mounted substantially parallel with the idle shaft 52. The right end of the illustrated drive shaft 48 is supported by the left part of the second case 41 with a bearing 92 while the left end of the illustrated drive shaft 48 is supported by the left part of the first case 40 with a bearing 93. The left end of the drive shaft 48 preferably carries a sprocket 49. The sprocket 49 can be integrally formed or separately formed and secured thereto. As shown in FIG. 1, the sprocket 49 preferably connects to a driven sprocket 51 of the rear wheel 7 with a chain 50. Other configurations, including belts, chains, flexible members, drive shafts and gear trains also can be used to transmit power to the rear wheel 7.

With reference now to FIG. 4, the secondary sheave shaft 47 and the drive shaft 48 preferably are defined by separate shafts. For saddle-type vehicles, such as motorcycles and scooters, for instance, which transmit driving force from the drive shaft 48 to the rear wheel 7 through a transmission member such as the chain 50, a transmission belt or a drive shaft, it is difficult to have a large spacing between the drive shaft 48 and the rear wheel 7. Thus, the placement of the drive shaft 48 relative to the vehicle body is restricted to some degree. On the other hand, the position of the secondary sheave shaft 47 and the idle shaft 52 of the speed-reduction mechanism 18 can be determined relatively freely. Thus, the illustrated engine unit 2 advantageously contains a separately formed secondary sheave shaft 47 and drive shaft 48 which allows increased flexibility in the positioning of the secondary sheave shaft 47 and the idle shaft 52. By forming the secondary sheave shaft 47 and the drive shaft 48 separately, the layout of the secondary sheave shaft 47 can adjusted without significant concern for the placement of the output shaft 48.

The secondary sheave shaft 47 in the illustrated configuration is disposed above the drive shaft 48 and slightly ahead of the drive shaft 48. Because the secondary sheave shaft 47 is disposed above the drive shaft 48 in the illustrated configuration, the lower portion of the engine unit 2 can be made compact, which ensures a relatively large vacant space under the engine unit 2. The illustrated idle shaft 52 is disposed forward of a generally transverse plane C that intersects the rotational axes of the second sheave shaft 47 and the drive shaft 48. Preferably, the axis of the idle shaft 52 is located between a generally horizontal plane that extends through the axis of the secondary sheave shaft 47 and another generally horizontal plane that extends through the axis of the drive shaft 48. Even more preferably, the idle shaft is positioned generally adjacent to the primary sheave 55. Because the idle shaft 52 is disposed ahead of the imaginary plane C, which connects the axis of the drive shaft 48 and the axis of the secondary sheave shaft 47, the rear portion of the engine unit 2 also can be made more compactly, which ensures a relatively large void behind the engine unit 2. Moreover, the reduction gear 75 (reduction large gear) of the idle shaft 52 can partially overlap the primary sheave 55 when viewed from the side. Such a construction also allows the rear part of the engine unit 2 to be reduced in size.

The secondary sheave shaft 47 is disposed vertically higher than the primary sheave shaft 55*d* and, as such, the secondary sheave 56 is disposed generally vertically higher than the primary sheave 55. Preferably, the secondary sheave 56 also is disposed above the primary sheave 55. Thus, a void is defined generally forward and vertically above the secondary sheave 56. Thus, in the illustrated engine unit 2, an air-intake component 154, which can comprise the intake pipe 23*a* and the carburetor 23, is able to be positioned in the void, which reduces the size of the illustrated engine unit 2.

The drive shaft 48 is located inside the profile or trace (i.e., the visible outline) of the transmission case 45 (i.e., the portion that encloses the continuously variable transmission) as viewed from the side of the vehicle body. In other words, the drive shaft 48 is arranged within the profile of the transmission case 45. Preferably, at least a majority of the drive shaft 48 (e.g., more than half of the drive shaft 48) is located inside of the profile of the transmission case 45. In other words, when viewed from the side of the vehicle, the profile of the transmission case 45 may intersect the drive shaft 48 such that a majority of the drive shaft 48 is positioned within the profile of the transmission case. In the illustrated engine unit 2, the reduction gear 77 of the drive shaft 48 also is disposed substantially inside the outline of the transmission case 45, as viewed from the side. Because the drive shaft 48 is disposed inside the outline of the transmission case 45 as viewed from the side, the drive shaft 48 and the speed-reduction mechanism 18 can be efficiently arranged in the illustrated engine unit 2 and the overall size of the engine unit can be reduced.

Figure 5:
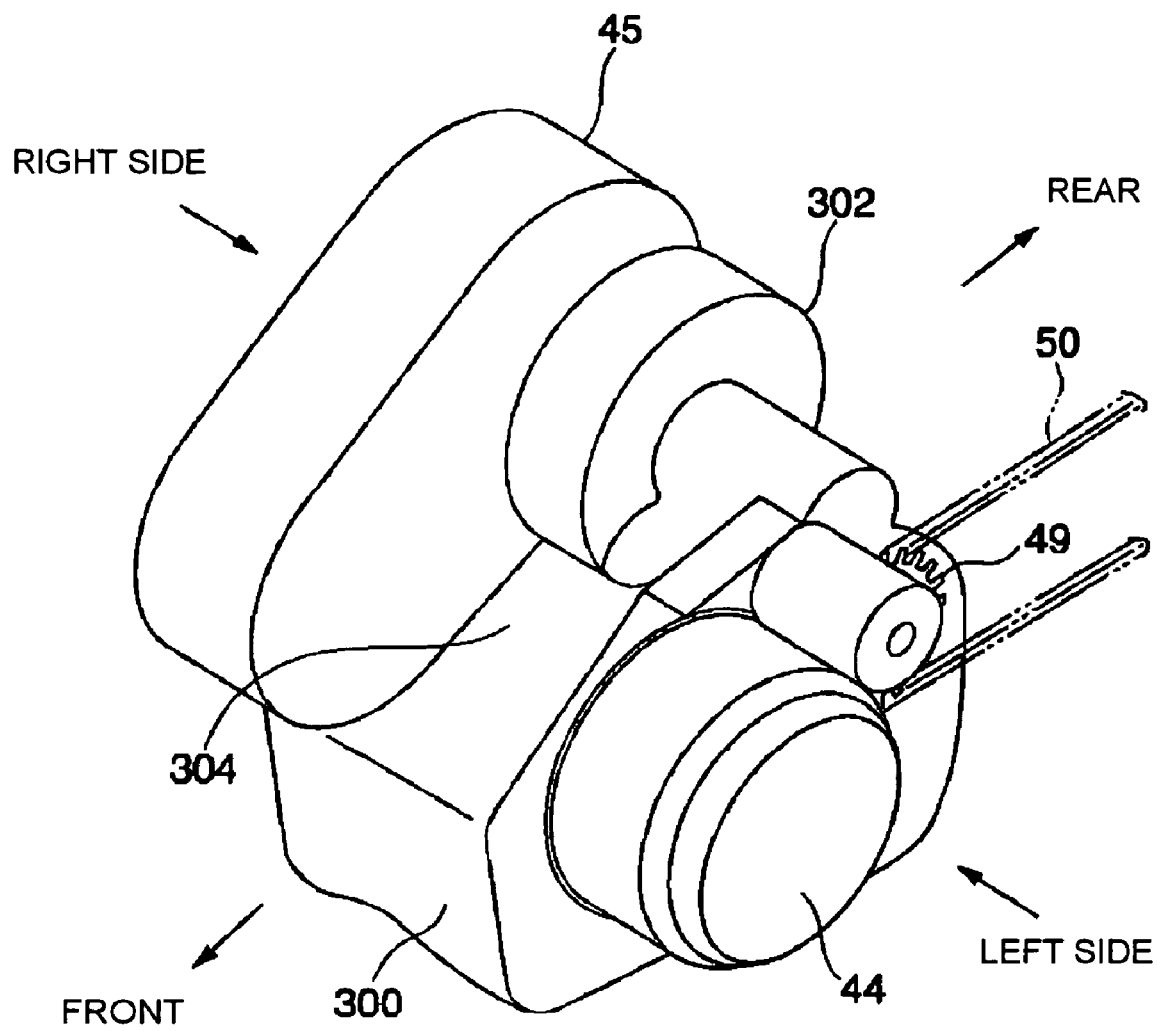
FIG. 5 is a perspective view of a portion of the engine unit of FIG. 1 as viewed from a front left side.

With reference now to FIG. 5, a principal portion 300 (hereinafter, referred to as an engine principal part) of the engine unit 2 and the transmission case 45 is shown in perspective view as viewed from a front upper side. For clarity, the cylinder block 19 of the engine body 15 and the air-intake component 154, best shown in FIG. 4, have been omitted from FIG. 5. As shown in FIG. 5, the transmission case 45 is disposed on the right side of the engine principal part 300. Because the secondary sheave 56 is disposed generally rearward of, and generally vertically above, the primary sheave 55, as described above, the transmission case 45 inclines upward in a rearward direction.

With continued reference to FIG. 5, a clutch chamber 302 contains the centrifugal clutch 17. The sprocket 49 carried by the drive shaft 48 is located to the left of the clutch chamber 302 in the illustrated configuration. As illustrated, when combined together, the transmission case 45 and the clutch chamber 302 have a breadth (lateral length) that is smaller than that of the engine principal part 300. Therefore, there is a relatively wide clearance region 304 provided on the left of the transmission case 45 and the clutch chamber 302. Thus, the air-intake component 154 can be positioned within the clearance region 304. In other words, the air-intake component 154 is disposed in the clearance region 304, which isolates the air-intake component from the transmission case 45 and the clutch chamber 302.

With reference now to FIG. 4, the intake pipe 23*a* connects to the cylinder head 20. The intake pipe 23*a* preferably extends rearward through the clearance region 304 as shown in FIG. 5. The carburetor 23 is mounted to the intake pipe 23*a*. Preferably, the intake pipe 23*a* is formed in two portions with the first portion connecting the carburetor 23 to the cylinder head 20 and the second portion extending between the carburetor 23 and an air cleaner 154C.

Figure 6:
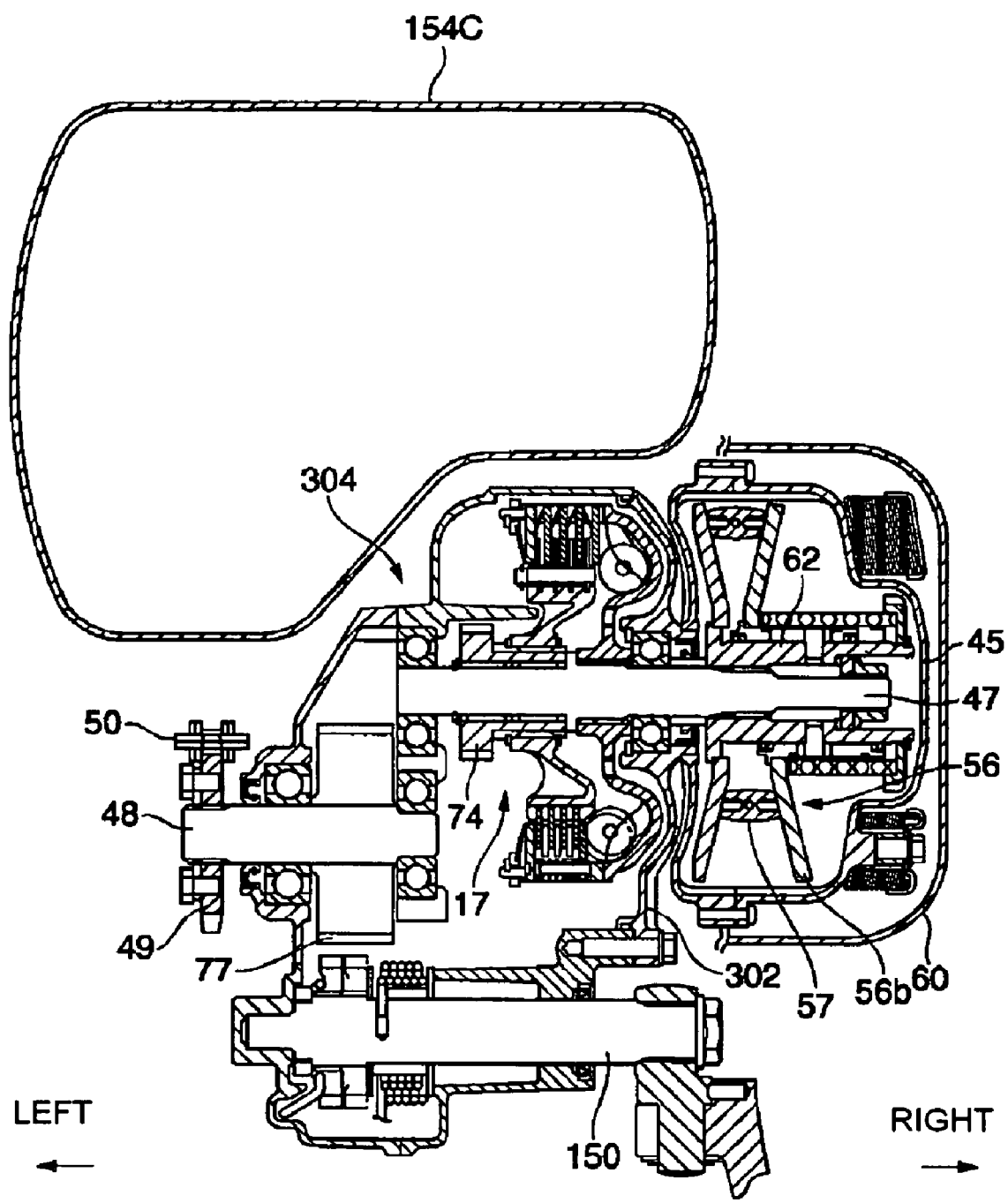
FIG. 6 is a cross-sectional view of a portion of the engine unit of FIG. 1 as viewed from the back.

In the illustrated configuration, the air cleaner 154C comprises a box-shaped casing that is larger than the intake pipe 23*a*. Due to the size of the air cleaner 154*c*, a relatively large space is needed to accommodate the air cleaner 154C. Accordingly, in one configuration, as shown in FIG. 6, the air cleaner 154C is disposed opposite to the secondary sheave 56 on the left side in the upper portion of the engine unit 2. Because the air cleaner 154C is disposed opposite to the secondary sheave 56, the likelihood of contact between the air cleaner 154C and the transmission case 45 is greatly reduced. In the illustrated configuration, part of the air cleaner 154C overlaps with the secondary sheave 56 when viewed from the side. As a result of this positioning, part of the air cleaner 154C overlaps with the transmission case 45 as viewed from the side and is located inside the outline of the transmission case 45 when viewed from the side. Thus, the height of the air cleaner 154C and the engine unit 2 is decreased relative to constructions in which the air cleaner 154C is not positioned in this manner.

Because the illustrated secondary sheave 56 is disposed vertically higher than the primary sheave 55 and the drive shaft 48, there is a spatial allowance around the drive shaft 48. Therefore, the layout around the drive shaft 48 can be determined relatively freely. Accordingly, the rear arm 8 can be lengthened, which improves steering stability and other vehicle ride characteristics. The illustrated pivot shaft 100 also can be located in a position lower than the axial center of the secondary sheave shaft 47.

The drive shaft 48 and the pivot shaft 100 can be arranged close to each other in the illustrated configuration. While any suitable spacing can be used, it is preferable have the spacing be less than the diameter of the secondary sheave 56 and, more preferably, less than the radius of the secondary sheave 56. With such a limited spacing, the slack of the chain 50 wound around the drive shaft 48 can be reduced when the rear arm 8 moves around the pivot shaft 100. Consequently, the transmission efficiency of the driving force to the rear wheel 7 can be improved and noise generation created by chain slack can be reduced. Even with a drive shaft as a transmission member in place of the chain 50, for instance, substantially the same advantages can be offered because the interval between the drive shaft 48 and the pivot shaft 100 is short. In other words, the transmission efficiency can be increased by the illustrated configuration while the rear arm 8 moves around the pivot shaft 100.

With reference now to FIG. 4, a starting kick shaft 150 (also referred to as a kick starter shaft) extends laterally below the drive shaft 48. The starting kick shaft 150 preferably is disposed inside the outline of the crank case 22 and outside the outline of the transmission case 45, when viewed from the side. Accordingly, the starting kick shaft 150 advantageously is disposed in the position that does not overlap with the transmission case 45 as viewed from the side.

Figure 7:
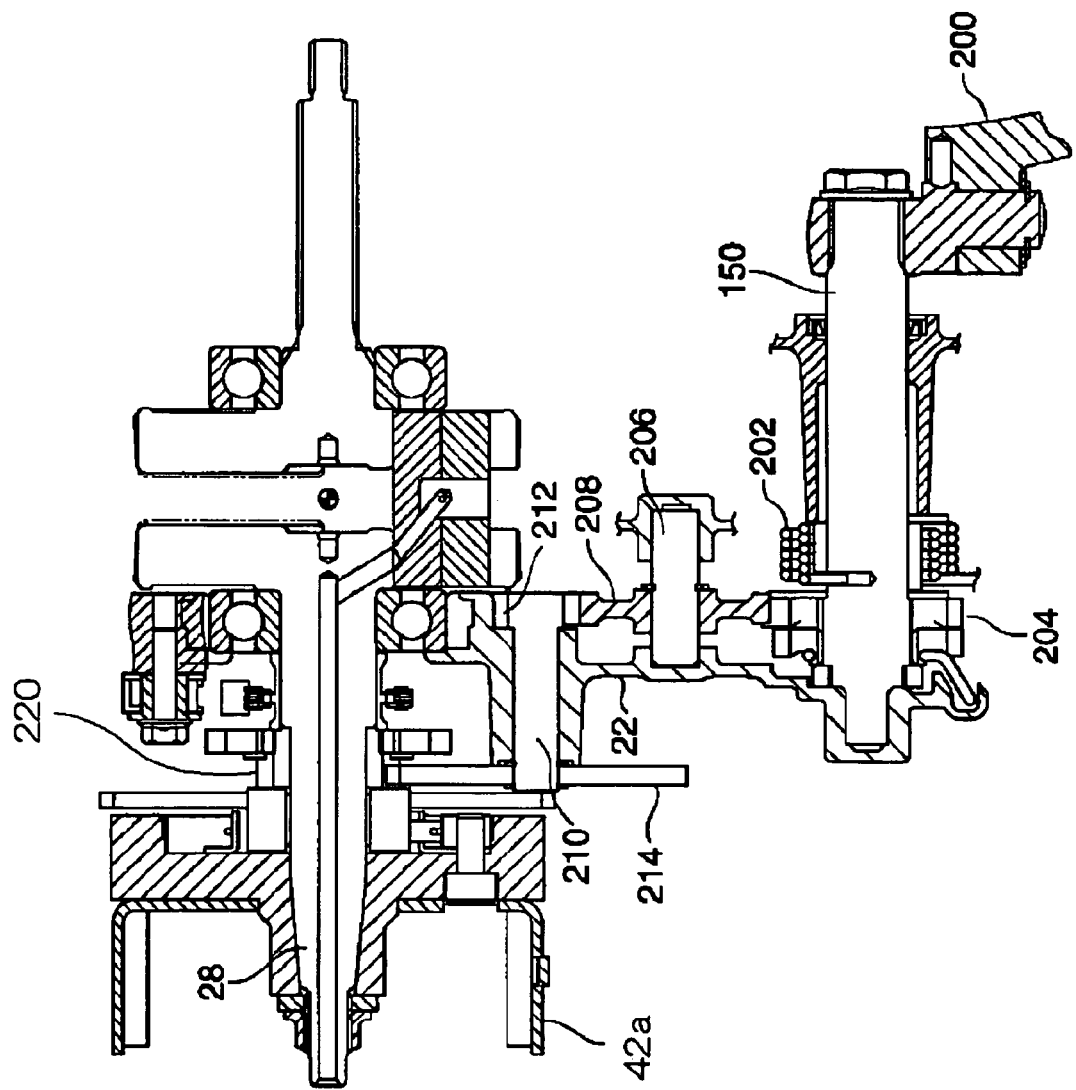
FIG. 7 is a cross-sectional view of a connection between a starting kick shaft and a crankshaft of the engine unit of FIG. 1.

With reference now to FIG. 7, the starting kick shaft 150 is rotatably supported relative to the crank case 22. A foldable kick pedal 200 is connected to the starting kick shaft 150. As described above, the secondary sheave shaft 47 is separate from the drive shaft 48 and is disposed in an upper portion of the engine unit 2. The engine unit 2 therefore has a relatively large vacant space at the lower portion. Thus, in the illustrated embodiment, the starting kick shaft 150 is disposed in that space. The starting kick shaft 150 can be positioned below the transmission case 45 (refer to FIG. 4) and can project from the side of the engine unit 2 in a substantially horizontal direction. In the illustrated embodiment, the starting kick shaft 150 is disposed on the right side of the engine body 15. Advantageously, the starting kick shaft 150 extends in the same direction as the transmission case 45. In some embodiments, both the starting kick shaft 150 and the transmission case 45 are disposed on the left side of the engine body 15 or engine unit 2.

With reference still to FIG. 7, a spring 202 is connected to the base of the starting kick shaft 150. The spring 202 biases the starting kick shaft 150 in a direction opposite to the rotating direction at kick starting. The starting kick shaft 150 also has a gear 204 fixed to the base. Preferably, the gear 204 is concentric with the kick shaft 150. At starting, the starting kick shaft 150 is kicked with the kick pedal 200 against the biasing force of the spring 202. The rotation of the starting kick shaft 150 is transmitted to a first idle shaft gear 208 via the gear 204. A first idle shaft 206 carries the first idle shaft gear 208.

The rotation of the first idle shaft gear 208 is transmitted to a gear 212 carried by a second idle shaft 210. As a result, the second idle shaft 210 rotates. A gear 214 is engaged with a gear 220 that is carried by the crankshaft 28. In the illustrated configuration, the gear 214 is mounted at the end of the second idle shaft 210. Other configurations are possible. When the second idle shaft 210 rotates, the torque of the second idle shaft 210 is transmitted to the crankshaft 28 through the gears 214, 220, thereby rotating the crankshaft 28. Thus, the crankshaft 28 is forced to rotate by kicking the kick pedal 200, so that the engine can be started.

The first idle shaft 206 and the second idle shaft 210 are rotatably supported relative to the crank case 22. With reference to FIG. 4, the first idle shaft 206 and the second idle shaft 210 preferably are disposed in a position that overlaps with the transmission case 45, as viewed from the side. The first idle shaft 206 and the second idle shaft 210 are, however, disposed in a position such that these shafts 206, 210 do not overlap with the primary sheave shaft 55d and the secondary sheave shaft 47 as viewed from the side. With such an arrangement, the rotation of the starting kick shaft 150 can be transmitted to the crankshaft 28 while not unduly influencing the layout of the primary sheave 55 and the secondary sheave 56 even though the starting kick shaft 150 is disposed below the transmission case 45.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A saddle-type vehicle comprising an engine unit, the engine unit comprising an engine body, a transversely extending crankshaft being positioned within the engine body, the engine unit also comprising a transmission, the transmission comprising a primary sheave and a secondary sheave, the secondary sheave being disposed vertically higher than the primary sheave, the primary sheave being connected to the crankshaft, the secondary sheave being connected to a secondary sheave shaft, the secondary sheave shaft extending in a transverse direction, a flexible transmitter wrapping around the primary sheave and the secondary sheave, a transmission case accommodating the primary sheave, the secondary sheave and the flexible transmitter, the engine unit also comprising a starting kick shaft, the starting kick shaft being disposed below the secondary sheave when the engine is viewed from the lateral side, the transmission case and the starting kick shaft extending outward from the engine unit in a first direction, and the starting kick shaft not being positioned within a profile of the transmission case when the engine unit is viewed from a lateral side.

2. The vehicle of claim 1, further comprising a drive shaft formed separate of the secondary sheave shaft and connected to the secondary sheave shaft such that rotation of the secondary sheave shaft causes rotation of the drive shaft.

3. The vehicle of claim 2, further comprising a speed-reduction mechanism, the mechanism comprising a laterally-extending idle shaft connected to the secondary sheave shaft and the drive shaft, the secondary sheave shaft being positioned above the drive shaft, a generally transverse plane that extends through a rotational axis of the secondary sheave shaft and a rotational axis of the drive shaft, the idle shaft being positioned between the generally transverse plane and the primary sheave and the drive shaft being positioned within the profile of the transmission case when the engine unit is viewed from the lateral side.

4. The vehicle of claim 3 further comprising a vehicle body supporting the engine unit such that the drive shaft is located rearward of the crankshaft, a rear arm movably supported at a pivot axis by the vehicle body, the rear arm supporting a rear wheel, a transmission member transmitting a driving force from the drive shaft to the rear wheel, the pivot axis of the rear arm being located rearward of the engine unit when the engine unit is viewed from the lateral side.

5. The vehicle of claim 4, wherein the pivot axis of the rear arm is located vertically lower than the rotational axis of the secondary sheave shaft.

6. The vehicle of claim 4, wherein the pivot axis of the rear arm is located within one diameter of the secondary sheave of the drive shaft.

7. The vehicle of claim 6, wherein the pivot axis of the rear arm is located within one radius of the secondary sheave of the drive shaft.

8. A saddle-type vehicle comprising an engine unit, the engine unit comprising a transversely extending crankshaft, a primary sheave being connected to the crankshaft, a secondary sheave connected to the primary sheave by a flexible transmitter, the secondary sheave being disposed vertically higher than the primary sheave, the secondary sheave being connected to a secondary sheave shaft, the secondary sheave shaft being connected to a drive shaft by a speed reduction configuration, the speed reduction configuration comprising an idle shaft, a transmission case enclosing the primary sheave and the secondary sheave together with the flexible transmitter, when viewed in an axial direction of the crankshaft, the secondary sheave shaft, the drive shaft and the idle shaft all being positioned within a profile of the transmission case, and a starter kick shaft being disposed outside of the profile of the transmission case but being connected to the crankshaft such that rotation of the starter kick shaft can result in rotation of the crankshaft.

9. The vehicle of claim 8, wherein the idle shaft is positioned between the crankshaft and the secondary sheave shaft.

* * * * *

UNITED STATES PATENT AND TRADEMARK OFFICE
CERTIFICATE OF CORRECTION

| | | |
|---|---|---|
| PATENT NO. | : 7,201,686 B2 | Page 1 of 1 |
| APPLICATION NO. | : 11/333807 | |
| DATED | : April 10, 2007 | |
| INVENTOR(S) | : Tatsuya Masuda et al. | |

It is certified that error appears in the above-identified patent and that said Letters Patent is hereby corrected as shown below:

First Page Col. 2 (Foreign Patent Documents), line 4, after "7/1991" please insert -- B62M 9/08 --.

Page 2 Col. 1 (Foreign Patent Documents), line 3, after "2/1999" please insert -- B62J 13/04 --.

Page 2 Col. 2 (Foreign Patent Documents), line 1, after "6/1999" please insert -- F02N 3/04 --.

Page 2 Col. 2 (Foreign Patent Documents), line 2, after "2/2000" please insert -- F02N 3/04 --.

Page 2 Col. 2 (Foreign Patent Documents), line 3, after "7/2000" please insert -- F02N 3/04 --.

Sheet 2 of 7 (Figure 2), line 1, above " ⇧ ", please insert -- FRONT OF VEHICLE BODY --.

Signed and Sealed this

Thirtieth Day of October, 2007

JON W. DUDAS
*Director of the United States Patent and Trademark Office*